United States Patent [19]

Fleming et al.

[11] Patent Number: 4,838,593
[45] Date of Patent: Jun. 13, 1989

[54] MOUNTING ARRANGEMENT FOR A VEHICLE BUMPER

[75] Inventors: Stephen D. Fleming, Rayleigh; Martyn G. Lane, Hockley, both of United Kingdom

[73] Assignee: Ford Motor Company, Dearborn, Mich.

[21] Appl. No.: 82,603

[22] Filed: Aug. 6, 1987

[30] Foreign Application Priority Data

Aug. 6, 1986 [GB] United Kingdom ................ 8619194

[51] Int. Cl.$^4$ ............................................. B60R 19/18
[52] U.S. Cl. ..................................... 293/126; 293/109; 293/154; 293/155; 293/120
[58] Field of Search ................ 293/102, 103, 107–114, 293/118, 119, 120–122, 126–128, 132–137, 142–155; 272/34; 411/85, 84, 107, 103, 340, 346, 401, 549, 550, 553, 908, 377, 508–510, 913, 182; 296/155

[56] References Cited

U.S. PATENT DOCUMENTS

| | | | |
|---|---|---|---|
| 2,731,290 | 1/1956 | Corydon, II | 293/108 |
| 4,039,215 | 8/1977 | Minhinnick | 293/142 |
| 4,095,831 | 6/1978 | Hagiwara et al. | 293/155 X |
| 4,193,621 | 3/1980 | Peichl et al. | 293/155 X |
| 4,373,826 | 2/1983 | Inamoto et al. | 411/508 X |
| 4,401,332 | 8/1983 | Kimura et al. | 293/135 |
| 4,460,205 | 7/1984 | Glance | 293/120 |
| 4,483,559 | 11/1984 | Lewis et al. | 293/155 X |
| 4,623,182 | 11/1986 | Trabert et al. | 293/155 |
| 4,679,837 | 7/1987 | Bayer et al. | 293/132 X |
| 4,715,645 | 12/1987 | Lewis et al. | 296/155 X |
| 4,758,034 | 7/1988 | Ghezzi et al. | 293/132 |
| 4,770,453 | 9/1988 | Reynolds | 293/155 X |
| 4,786,459 | 11/1988 | Mundo | 293/132 |

FOREIGN PATENT DOCUMENTS

| | | | |
|---|---|---|---|
| 0203699 | 12/1986 | European Pat. Off. | |
| 2509718 | 9/1976 | Fed. Rep. of Germany | 293/155 |
| 888450 | 1/1962 | United Kingdom | 411/182 |
| 2154953 | 9/1985 | United Kingdom | 293/122 |

Primary Examiner—Douglas C. Butler
Attorney, Agent, or Firm—Daniel M. Stock; Clifford L. Sadler

[57] ABSTRACT

A vehicle bumper of molded construction and with wrap-around ends is mounted on a vehicle by two push-fit post/socket joints at the front (or rear) of the vehicle and by two side extension connectors which include secure fastenings. The side connectors can have a snap-fit feature for initial location of the bumper, with the snap-fit location being subsequently backed up by insertion of a threaded fastener. The push-fit joints require no additional securing device.

10 Claims, 2 Drawing Sheets

MOUNTING ARRANGEMENT FOR A VEHICLE BUMPER

BACKGROUND OF THE INVENTION

This invention relates to a mounting arrangement for a vehicle bumper which facilitates the mounting of the bumper on the vehicle. The arrangement can be used on both the front and back ends of the vehicle. For convenience, this specification will refer only to the front bumper mounting, but it is to be understood that the invention relates to both front and rear bumper mountings, and that features described here for front bumpers also apply, mutatis mutandis, to rear bumpers and their mountings.

SUMMARY OF THE INVENTION

According to the invention, there is provided a mounting arrangement for mounting a bumper having wrap-around ends onto a vehicle, wherein two, parallel, forward facing sockets are provided either on the vehicle body or on the bumper, two parallel, rearwardly projecting posts are provided on the other of the bumper on the vehicle body, the parts being snug fit in the sockets, and means for connecting the wrap-around bumper ends to the sides of the vehicle body so that they prevent disengagement of the posts from the sockets.

Preferably, the sockets are provided on the vehicle body and the posts on the bumper.

The posts preferably are a simply push fit into the sockets and have no separate securing means to retain them there, although the sockets may be adapted to frictionally grip the posts.

The connecting means for the bumper ends can include both a snap-fit fastening (which is engaged as the bumper is offered up to the vehicle) and a secure fastening such as a nut and bolt which can be put into place once the bumper is correctly positioned, to prevent the sockets and posts from becoming disengaged.

With this construction, there is no requirement for access by fastening tools to the space at the front end of the vehicle where the bumper is mounted. As a result, a particularly neat junction between the body and the bumper is possible. The only place where access by tools is required to secure the bumper is at the vehicle side, adjacent the wheel arches and access in this area presents no problem.

The posts, when mounted on the bumper itself, can be height adjustable after the bumper has been mounted on the vehicle to allow the gap betwee the bumper and the bodywork to be adjusted. Access for making this adjustment can be provided through a hole drilled in the bumper itself and opening in the under surface of the bumper.

DESCRIPTION OF A PREFERRED EMBODIMENT

Figure 1:
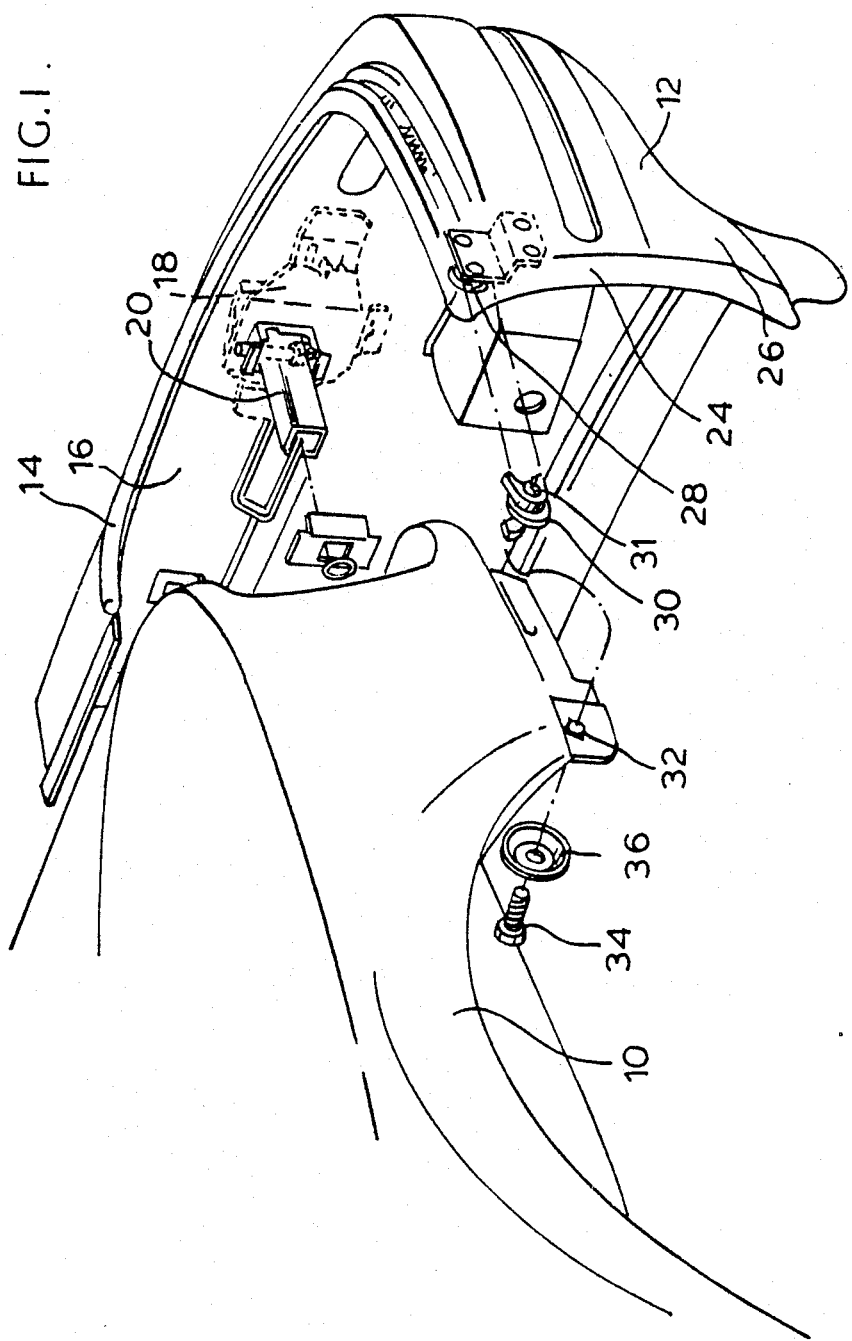
FIG. 1 is an exploded view of a bumper and part of a vehicle to which it is to be mounted.

FIG. 1 shows the front fender 10 of a car, and a portion 12 of a front bumper to be attached to the fender 10 and to the front of the car.

The bumper 12 is of the type which has a plastic outer skin 14 and a filling of foam 16. Such a bumper is described in our European patent application No. 0 203 699. The present invention is not, however, restricted to use with this type of bumper. Embedded in the foam are two post support structures 18 (only one of which can be seen in FIG. 1) to which posts 20 are secured by height-adjustable connectors which will be described more fully later on.

Sockets 22 (FIG. 2) are fitted in the front of the car body to receive the posts.

At the extreme ends 24 of the wrap-around portions 26 of the bumper, a mounting button 28 (shown in detail in FIG. 3) is attached by heat-staking to the skin of the bumper. A clip 30 is fitted in an aperture 32 formed on the vehicle body adjacent the wheel arch, and the clip 30 is shaped so as to receive the button 28 in a snap-locking manner.

To complete the assembly, a bolt 34 is passed through a washer 36, through a bore in the clip 30 and thus through the aperture 32 and is screwed into a threaded insert 38 in the button 28.

Figure 2:
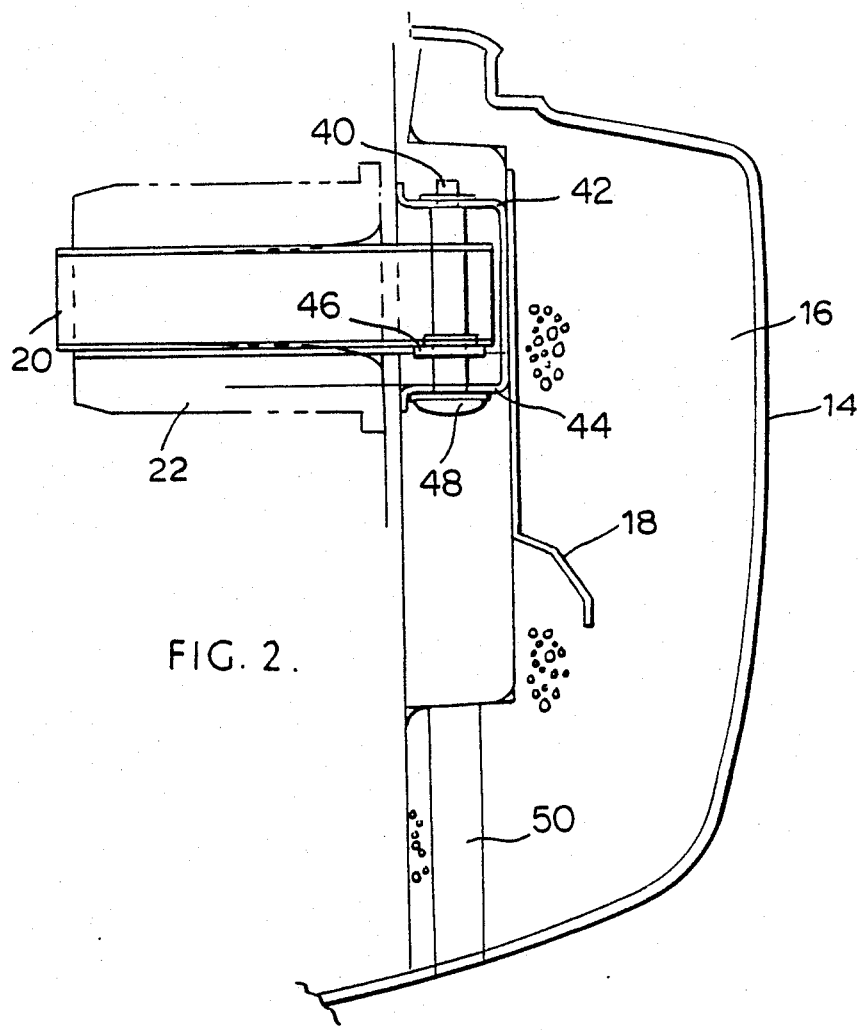
FIG. 2 is a vertical section through a socket/post joint.

FIG. 2 shows one socket 22. In this figure, the socket 22 is shown apart from any supporting structure formed by the car bodywork, but it will in fact be fully supported on the bodywork. The socket comprises a body of foamed polyurethane with a central aperture which is slightly undersized relative to the external cross-sectional dimensions of the post 20 In the embodiment described, the post 20 is generally square in cross-section and so the socket aperture will also be generally square. The slight under-sizing is indicated by dotted lines in FIG. 2 and ensures that the post 20 is a tight push fit in the socket (the socket walls are able to yield when the post is pushed in) and is frictionally gripped by the socket.

The end of the post 20 which is attached to the bumper 12 is mounted on a threaded, captive pin 40. The pin is held against axial movement between two end plates 42 and 44 and is threaded onto a nut 46 carried by the post 20. As the pin 40 is rotated, the nut 46 moves up or down the pin so that the height of the bumper relative to the car is altered. The pin is turned by engaging a suitable tool with the pin head 48. The tool is introduced through a bore 50 which is cut through the material of the bumper 12, for example by a water jet.

Figure 3:
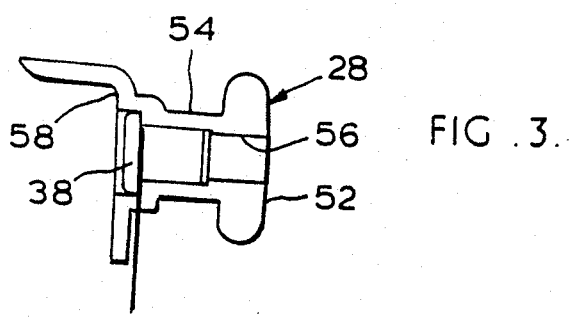
FIG. 3 shows a bracket to be attached to a wrap-around end of the bumper.

The mounting button 28 shown in FIG. 3 has a head 52 on a neck 54 with a central stepped bore 56. This is all made of plastic. A threaded metal insert 38 is fitted in the bore 56 from behind and is captive in the button when the rear face 58 of the button is attached to the bumper skin.

To mount the bumper 12 on the car, it is offered up to the front of the car and the ends of the posts 20 are introduced in to the sockets 22. As the posts 20 are pushed on, the buttons 28 engage in the clips 30 and snap into place with the neck 54 of the button 28 received in the open circular portion 31 of the clip 30. At this point, the bumper is firmly held to the vehicle against movement other than forwardly from the assembled position. However, to complete the fixing, bolts 34 are put into place and tightened preventing forward movement of the bumper. Finally, any necessary adjustment to the height and vertical symmetry of the bumper relative to the car is done by means of the pins 40.

This arrangement thus provides very simple and effective mounting of a bumper. The only fastenings which actually require the use of tools are the bolts 34, access to which is easy to obtain. Because the assembly line now does not require access at the front of the car, the styling at the front end is uncompromised.

What is claimed is:

1. A mounting arrangement for mounting a bumper having wrap-around ends onto a vehicle, comprising two parallel foward facing sockets provided between the vehicle body and the bumper, two parallel rearwardly projecting posts provided between the bumper and the vehicle body, the posts being received in frictionally gripped relationship in the sockets, and means for connecting the wrap-around bumper ends to the sides of the vehicle body to prevent disengagement of the posts from the sockets, wherein the connecting means for the bumper comprises snap-fit fastener means operatively carried between the bumper ends and the vehicle body for securing the bumper against movement except in the forward direction when the bumper is offered up to the vehicle and comprises secure fastener means engagable with the snap-fit fastener means for securing the bumper against movement in the forward direction which is put into place once the bumper is correctly positioned.

2. An arrangement as defined in claim 1, wherein the sockets are carried on the vehicle body and the posts on the bumper.

3. An arrangement as defined in claim 2 wherein the posts are a simple push fit into the sockets and are secured solely by the fit.

4. An arrangement as defined in claim 2, and further comprising:
a threadedly engaging adjusting pin operatively carried between the bumper and the posts for varying the vertical position of the bumper with respect to the vehicle.

5. An arrangement as defined in claim 4, wherein the adjusting pin includes a downwardly facing tool receiving head, and further comprising means defining a bore through portions of the bumper adjacent the head for receiving a tool.

6. An arrangement as defined in claim 1 wherein the posts are a simple push fit into the sockets and are secured solely by the fit.

7. An arrangement as defined in claim 1 wherein the secure fastener means is a threaded fastener and the snap-fit fastener means comprises a part adapted to be secured to the vehicle body and a part to be secured to the bumper, both parts having a bore therethrough for the fastener and one part including a captive threaded insert into which the fastener can be screwed.

8. An arrangement as defined in claim 7 wherein all the parts of the snap-fit fastener means other than the captive insert are formed of plastic.

9. An arrangement as defined in claim 1, and further comprising:
a threadedly engaging adjusting pin operatively carried between the bumper and the posts for varying the vertical position of the bumper with respect to the vehicle.

10. An arrangement as defined in claim 9, wherein the adjusting pin includes a downwardly facing tool receiving head, and further comprising means defining a bore through portions of the bumper adjacent the head for receiving a tool.

* * * * *